United States Patent
Casati et al.

(10) Patent No.: US 9,783,633 B2
(45) Date of Patent: Oct. 10, 2017

(54) PIPA POLYOL BASED VISCOELASTIC FOAMS

(71) Applicant: DOW GLOBAL TECHNOLOGIES LLC, Midland, MI (US)

(72) Inventors: Francois Casati, Pfaffikon (CH); Alberto Lora Lamia, Waedenswil (CH); Dale Hunter, Lake Jackson, TX (US); Irena Amici-Kroutilova, Waedenswil (CH); Paul A. Cookson, Samstagern (CH); Van M. Delk, Angleton, TX (US)

(73) Assignee: Dow Global Technologies LLC, Midland, MI (US)

( * ) Notice: Subject to any disclaimer, the term of this patent is extended or adjusted under 35 U.S.C. 154(b) by 29 days.

(21) Appl. No.: 14/911,721

(22) PCT Filed: Sep. 11, 2014

(86) PCT No.: PCT/US2014/055266
§ 371 (c)(1),
(2) Date: Feb. 11, 2016

(87) PCT Pub. No.: WO2015/038829
PCT Pub. Date: Mar. 19, 2015

(65) Prior Publication Data
US 2016/0200855 A1    Jul. 14, 2016

Related U.S. Application Data

(60) Provisional application No. 61/877,290, filed on Sep. 13, 2013, provisional application No. 61/877,287, filed on Sep. 13, 2013, provisional application No. 62/017,735, filed on Jun. 26, 2014.

(51) Int. Cl.
| | | |
|---|---|---|
| C08G 18/76 | (2006.01) |
| C08G 18/48 | (2006.01) |
| C08K 5/00 | (2006.01) |
| C08G 18/40 | (2006.01) |
| C08L 75/04 | (2006.01) |
| C08G 101/00 | (2006.01) |

(52) U.S. Cl.
CPC ....... *C08G 18/7664* (2013.01); *C08G 18/409* (2013.01); *C08G 18/4883* (2013.01); *C08G 18/7621* (2013.01); *C08G 18/7671* (2013.01); *C08K 5/0066* (2013.01); *C08G 18/4009* (2013.01); *C08G 2101/005* (2013.01); *C08G 2101/0008* (2013.01); *C08G 2101/0058* (2013.01); *C08G 2101/0083* (2013.01); *C08G 2350/00* (2013.01)

(58) Field of Classification Search
CPC .......................... C08G 18/409; C08G 18/4009
See application file for complete search history.

(56) References Cited

U.S. PATENT DOCUMENTS

| | | | | |
|---|---|---|---|---|
| 4,863,976 A * | 9/1989 | Nichols | .............. | C08G 18/4018 252/182.24 |
| 4,883,825 A * | 11/1989 | Westfall | ............. | C08G 18/4837 521/112 |
| 5,093,380 A * | 3/1992 | Takeyasu | ........... | C08G 18/4837 521/131 |
| 5,877,227 A * | 3/1999 | Murty | .................... | C08G 18/10 521/159 |
| 5,977,198 A * | 11/1999 | Hettel | ................ | C08G 18/4072 521/128 |
| 6,506,813 B1 | 1/2003 | Parfondry | | |
| 6,593,387 B2 * | 7/2003 | Parfondry | .............. | C08G 18/10 521/130 |
| 6,774,153 B2 * | 8/2004 | Parfondry | ............ | C08G 18/409 521/130 |
| 7,947,756 B2 | 5/2011 | Andries | | |
| 8,299,138 B2 * | 10/2012 | Kimura | ............. | C08G 18/3275 521/130 |
| 8,318,823 B2 | 11/2012 | Triouleyre | | |
| 2009/0306237 A1 | 12/2009 | Babb | | |
| 2013/0289150 A1* | 10/2013 | Hager | ................ | C08G 18/4829 521/126 |
| 2015/0166713 A1* | 6/2015 | Franceschin | ....... | C08G 18/4841 521/128 |

FOREIGN PATENT DOCUMENTS

| | | |
|---|---|---|
| WO | 01/32736 A | 5/2001 |
| WO | 2013/045336 A | 4/2013 |
| WO | 2014/037558 A | 3/2014 |

* cited by examiner

*Primary Examiner* — Melissa Rioja

(57) ABSTRACT

Viscoelastic foam is made by reacting an isocyanate compound with water and a polyol mixture. The polyol mixture contains a dispersion of polyurethane or polyurethane-urea particles in a carrier polyol (a PIPA polyol) and at least one other polyol that is a homopolymer of propylene oxide or a copolymer of 20 to 99.9 weight-% propylene oxide and 0.1 to 80 weight-% ethylene oxide, has 2 to 4 hydroxyl groups per molecule and has a hydroxyl equivalent weight of 200 to 400. The VE foams are characterized by high airflows and long recovery times.

19 Claims, No Drawings

PIPA POLYOL BASED VISCOELASTIC FOAMS

This invention relates to the production of viscoelastic polyurethane foam.

There exists a class of polyurethane foams known as viscoelastic (VE) foams. They are characterized as having resiliency values below 15% and by recovering slowly after they are compressed. These properties distinguish the VE foams from HR (High Resiliency) and conventional flexible polyurethane foams, which have much greater resiliency and which recover almost immediately after compression. These viscoelastic foams are sometimes marketed as "memory" foam. They are being used increasingly in pillows and mattresses, where the viscoelastic character of the foam imparts a feel that consumers perceive as highly comfortable. They are also used in acoustic applications to reduce NVH (noise, vibration and harshness) and in various applications such as earplugs where slow recovery is advantageous.

Like HR and conventional flexible polyurethane foams, the VE foams are made in a reaction of a polyisocyanate with one or more polyalcohol (polyol) compounds and water. Water plays an important function. It reacts with isocyanate groups to generate carbon dioxide, which acts as a blowing gas.

Although the starting materials in each case belong to similar broad classes (polyisocyanate and polyols in each case, together with water), those starting materials differ in their specifics, in very important ways. The HR and conventional flexible polyurethane foams are made primarily from polyether polyols that have hydroxyl equivalent weights of 1000 to 2000, whereas VE foams are made primarily from polyols that have equivalent weights that are typically 230 to 350, combined with higher equivalent weight polyols to produce a polymer with a glass transition temperature ($T_g$) above −20° C. and up to 50° C. These differences have a profound effect on how the systems react and cure. In the conventional foam systems, the molar ratio of water to the polyether polyol is somewhat high, with a ratio of 6-12 being typical. Every molecule of polyether polyol, therefore, must compete with a large number of moles of water as they both seek out isocyanate groups for reaction. In VE foam systems, the mole ratio of water to polyols is much lower—more typically in the range of 1 to 3. The smaller amount of water makes the reaction system susceptible to major processing problems such as incomplete expansion, settling, bulging or even foam collapse. Whereas HR and conventional flexible foam systems are rather robust, the VE systems are very sensitive to the type of and levels of the surfactant and catalysts, as well as small changes in the reactants themselves and the reaction conditions (especially temperature).

Another problem with VE foams is one of cell-opening. The lower molecular weight of the polyols used leads to a more highly crosslinked polymer structure that, in turn, tends to form closed cells. When the foam cools, the cell gases contract, forming subatmospheric intracellular pressures. The polymer network and foam density are not enough to support the foam under the pressure of the atmosphere, and so it tends to shrink. In addition, a tight (highly closed-cell) foam impacts negatively affects perceptions of foam comfort.

Materials sometimes are added to foam formulations to help open the cells. One type of cell opener is a polymer polyol, which is a dispersion of small polymer particles in a polyol. During foaming, the small polymer particles help break cell windows, which opens the cells and reduces shrinkage. The polymer particles also tend to increase foam load-bearing, which is undesirable for VE foams.

Polymer polyols have been used only sparingly in viscoelastic foam formulations. Their use in VE foam formulations is described, for example, in U.S. Pat. No. 7,947,756, U.S. Pat. No. 8,318,823, U.S. Pat. No. 2009-0306237 and WO 2013-045336. In each of these are mentioned several types of polymer polyols, which are classified according to the nature of the dispersed polymer particles. In SAN types, the dispersed particles are polymers of styrene and acrylonitrile. Other types are so-call "PHD" or polyurea dispersions, polyhydrazide dispersions. Another type mentioned is the so-called "PIPA" polyols, in which the dispersed polymer particles are polyurethane or polyurethane-urea.

PIPA polyols differ from the SAN types in at least one very important respect. Whereas SAN particles are essentially devoid of reactive sites, PIPA particles carry significant numbers of functional groups that react readily with isocyanate components of the foam formulation. Thus, the PIPA particles themselves participate in the foam curing reaction in a way that SAN particles do not. Therefore, although some experimental work involving the SAN-types is reported in the references mentioned above (with regard to a limited range of formulations), the performance of PIPA polyols, or the conditions in which they can be successfully employed in VE foam formulations, remains unknown.

This invention is a method of making a viscoelastic foam, comprising combining at least one organic polyisocyanate with water and a polyol mixture at an isocyanate index of 60 to 150 to form a reaction mixture and curing the reaction mixture to form a polyurethane-urea foam having a foam density of 30 to 120 kg/m$^3$, a resiliency of less than 15% and a recovery time (measured as described below) of at least 3 seconds, wherein the polyol mixture includes:

Polyol A: at least one dispersion of polyurethane and/or polyurethane-urea particles in a carrier polyol, wherein the carrier polyol has an average molecular weight of 600 to 5000 and an average of at least two hydroxyl groups per molecule, the dispersed polyurethane or polyurethane-urea particles constitute from 2 to 50 weight percent of the dispersion and the dispersion has a hydroxyl number of at least 40; and Polyol B: at least one polyol which is a homopolymer of propylene oxide or a copolymer of 20 to 99.9 weight-% propylene oxide and 0.1 to 80 weight-% ethylene oxide, has 2 to 4 hydroxyl groups per molecule and has a hydroxyl equivalent weight of 200 to 400;

and further wherein Polyols A and B together constitute at least 75 weight-percent of all isocyanate-reactive materials other than water in the reaction mixture and the polyol mixture contains at least 1 weight-percent of the dispersed polyurethane or polyurethane-urea particles.

Surprisingly, the Polyol A material (sometimes referred to herein as a "PIPA polyol") can be included in the reaction mixture without causing processing difficulties, despite the unpredictable effect of the presence of reactive groups on the dispersed particles. A good quality viscoelastic foam is formed, even in continuous slabstock VE foam processes, which are notoriously susceptible to small changes in formulations and foaming conditions. Another beneficial and surprising effect is that certain important attributes of the VE foam are improved. In particular, the foam is more open-celled, as indicated by airflow measurements, compared to when an SAN-type copolymer polyol is used instead of the PIPA polyol (at comparable solids levels). This is quite surprising in view that the reactive groups on the particles would be expected to further increase polymer crosslinking and, if anything, produce a "tighter" foam with more closed cells, lower airflow, and greater tendency to shrink. In addition, the VE foams of the invention typically exhibit longer recovery times than when an SAN-type copolymer is used. This is another surprising finding since the use of PIPA polyol reduces the pneumatic effect of a VE foam by opening its cell structure. The longer recovery times are very beneficial attributes of VE foams, as they contribute to an increased perception of comfort in bedding and other applications and help with sound damping.

Yet another advantage is that VOCs are reduced, compared to when the foam is produced with an SAN-type polymer polyol instead of the PIPA polyol.

The polyisocyanate compound used to make the VE foam may have an isocyanate equivalent weight of up to 300, for example. The isocyanate equivalent weight may be up to 250, up to 175, and in some embodiments is 50 to 175. If a mixture of polyisocyanate compounds is used, these equivalent weights apply with respect to the mixture; individual polyisocyanate compounds in such a mixture may have isocyanate equivalent weights above, within or below those ranges.

Examples of useful polyisocyanates include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, 1,3- and/or 1,4-bis(isocyanatomethyl)cyclohexane (including cis- and/or trans isomers), methoxyphenyl-2,4-diisocyanate, diphenylmethane-4,4'-diisocyanate, diphenylmethane-2,4'-diisocyanate, hydrogenated diphenylmethane-4,4'-diisocyanate, hydrogenated diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4''-triphenyl methane triisocyanate, polymethylene polyphenylisocyanate (PMDI), toluene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, toluene-2,4-diisocyanate, toluene-2,6-diisocyanate or mixtures thereof. Diphenylmethane-4,4'-diisocyanate, diphenylmethane-2,4'-diisocyanate and mixtures thereof are generically referred to as MDI, and all can be used. "Polymeric MDI", which is a mixture of PMDI and MDI, can be used. Toluene-2,4-diisocyanate, toluene-2,6-diisocyanate and mixtures thereof are generically referred to as TDI, and all can be used.

To make the VE foam, the polyisocyanate compound(s) are combined with water and a polyol mixture at an isocyanate index of 60 to 150 to form a reaction mixture. Isocyanate index refers to 100 times the ratio of isocyanate groups to isocyanate-reactive groups provided by the starting materials (i.e., prior to the consumption of any of those groups in the curing reaction that forms the foam.) A preferred isocyanate index is 60 to 120, and a more preferred index is 70 to 100. The water and various polyols that form the polyol mixture all can be mixed together before they are combined with the polyisocyanate. Alternatively, they can be combined with the polyisocyanate individually (i.e., as separate streams), or can be formed into any submixtures that are then combined with the polyisocyanate. Due to the speed of the curing reaction, it is preferred to combine the water and polyols with the polyisocyanate simultaneously or nearly simultaneously (such as within 5 seconds).

The polyisocyanate, water and polyol mixture preferably are combined using a mixhead or other apparatus that creates an intimate mixture of these components (as well as other components in the reaction mixture as described below).

The amount of water is generally expressed in terms of parts by weight per 100 parts by weight of the polyol mixture. A suitable amount is 0.5 to 6 parts, and a more suitable amount is 1 to 3.5 parts, per 100 parts by weight polyol mixture. An especially preferred amount is 1.25 to 2.5 parts per 100 parts by weight polyol mixture.

The polyol mixture includes a PIPA polyol, sometimes identified herein as Polyol A. The amount of Polyol A, as is the case with all other polyols, is based on the combined weight of all isocyanate-reactive materials provided to the reaction mixture, except for water (the amount of which is specified separately). The amount of Polyol A is sufficient to provide the polyol mixture with at least 1 weight percent of the dispersed polyurethane or polyurethane-urea particles. The polyol mixture preferably contains at least 2 weight percent of the dispersed particles, and may contain up to 25 weight percent, up to 20 weight percent or up to 10 weight percent thereof.

In some embodiments, the polyol mixture contains 3 to 60 weight-percent of Polyol A. A preferred amount is 5 to 25 weight-% and a still more preferred amount is 5 to 20 weight-%. In some embodiments, the polyol mixture includes 5 to 15 weight percent or 5 to 20 weight-% of the PIPA polyol(s).

The PIPA polyol (Polyol A) is at least one dispersion of polyurethane and/or polyurethane-urea particles in a carrier polyol. The carrier polyol forms a continuous phase into which polyurethane or polyurethane-urea particles are dispersed. The carrier polyol has an average molecular weight of 600 to 5000 and an average of at least two hydroxyl groups per molecule. The carrier polyol may have, for example, an average molecular weight of 700 to 1200, 1200 to 2000, or 2000 to 4000. The carrier polyol may have an average hydroxyl equivalent weight of 250 to 1500, 350 to 1250, or 500 to 1000. It preferably contains, on average, 2 to 8, preferably 2 to 4 and still more preferably 2 to 3, hydroxyl groups per molecule. The carrier polyol may be a mixture of two or more polyols, in which case the foregoing values pertaining to molecular weight, equivalent weight and functionality apply with respect to the mixture.

The carrier polyol(s) may be, for example, a polyether, a polyester, a polycarbonate, a polymer of butadiene, an acrylate polyol, or other type. Polyether polyols are preferred, particularly propylene oxide homopolymers and copolymers of propylene oxide and ethylene oxide.

The hydroxyl groups on the carrier polyol may be primary or secondary hydroxyl groups. In some embodiments, at least 50%, at least 75%, or at least 85% of the hydroxyl groups are secondary hydroxyl groups. In other embodiments, 50 to 100% of the hydroxyl groups are primary hydroxyl groups.

The polyurethane or polyurethane-urea particles may be produced by the in situ polymerization of a polyisocyanate compound with a low molecular weight polyol, aminoalcohol, amine or hydrazide compound in the presence of the carrier polyol. Such in situ methods for producing a PIPA polyol are well-known and described for example, in U.S. Pat. No. 4,293,470, U.S. Pat. No. 4,305,857, U.S. Pat. No. 4,374,209, U.S. Pat. No. 4,438,252, U.S. Pat. No. 4,497,913, U.S. Pat. No. 4,518,778, U.S. Pat. No. 4,554,306, U.S. Pat. No. 5,488,085, U.S. Pat. No. 6,881,783, US2006-0058410, WO 94/20558, WO 2012/154820, WO 2012-154831, U.S.

Provisional Application No. 61/877,287 (filed Sep. 13, 2013) and U.S. Provisional Application No. 61/877,290 (filed Sep. 13, 2013).

In such an in situ dispersion process, the polyisocyanate and the low molecular weight polyol, aminoalcohol, amine, or hydrazide compound are dispersed in the carrier polyol under conditions such that the polyisocyanate groups react with the low molecular weight polyol, aminoalcohol, amine, or hydrazide compound to form the particles. A portion of the polyisocyanate groups may react with hydroxyl groups on the carrier polyol, in which case some grafting of the polyurethane or polyurethane-urea particles occurs.

The polyisocyanate used to make the PIPA polyol may be any as described above. The low molecular weight polyol, aminoalcohol, amine, or hydrazide preferably has an average of 2 to 6 isocyanate-reactive groups, and an average equivalent weight per isocyanate group of up to 150, preferably up to 100 and more preferably up to 75. If a mixture of two or more such compounds is used, the foregoing values apply with respect to the mixture. The low molecular weight polyol in some embodiments contains 2 or more hydroxyl groups and no amine hydrogens. It may be amine-initiated. Triethanolamine is an especially preferred low molecular weight polyol. The aminoalcohol has at least one hydroxyl group and at least one amine hydrogen. Examples of aminoalcohols include diethanol amine, monoethanol amine, diisopropanol amine, monoisopropanol amine, and other mono- and dialkanol amines.

The low equivalent weight polyol, aminoalcohol, amine or hydrazide may be used in a small excess to provide hydroxyl and/or amino groups to the polyurethane and/or polyurethane-urea particles. Even when the polyisocyanate is present in stoichiometric amounts or even a small excess, steric hindrance may prevent complete reaction, leading to the presence of residual hydroxyl and/or amino groups on the dispersed particles.

The PIPA polymer may be formed by conducting the reaction in the presence of one or more stabilizers that, in the finished product, help to reduce particle settling and in that way increase the storage stability of the PIPA polyol product. The stabilizer may be produced during the PIPA-forming reaction, or may be a previously-formed material. In some cases, the stabilizer is a polyether that is soluble in the carrier polyol. Such a polyether may have at least one polyether segment with a molecular weight of 200 to 8000. The polyether may contain reactive groups through which the PIPA particles become bonded during or after the PIPA-forming reaction. Examples of such stabilizers include isocyanate-terminated polyethers and polyethers terminated with alkanolamine groups (such as —N—(CRH—CH$_2$OH)$_x$) groups (where R is hydrogen or lower alkyl, especially hydrogen or methyl, and x is 1 or 2). Stabilizers of those types are described, for example, in U.S. Pat. No. 4,305,857 and US Provisional Patent Application No. 61/817,290, filed 13 Sep. 2013. Other types of useful stabilizers include various silicone surfactants. The stabilizer may constitute, for example, 0.1 to 10% of the total weight of the PIPA polyol.

Water may also be present in the PIPA-forming reaction. A suitable amount is 0 to 30, preferably 0 to 2, weight percent of the total weight of the starting materials including the weight of the carrier polyol(s), any stabilizer(s) and the PIPA-forming reactants.

The dispersed polyurethane or polyurethane-urea particles constitute 2 to 50 weight percent of the dispersion. They may constitute 5 to 50, 5 to 30, 5 to 25, 10 to 25 or 10 to 20 weight-% of the dispersion. In the case of an in situ dispersion, the weight of the dispersed polyurethane or polyurethane-urea particles is a calculated weight, equal to the combined weight of (a) the polyisocyanate(s) introduced into the PIPA-forming process, (b) the low molecular weight polyols, aminoalcohols, amines and/or hydrazides introduced into the PIPA-forming process, (c) any seed particles introduced into the PIPA-forming process and (d) any polyisocyanates used to produce an isocyanate-terminated stabilizer that is introduced into the PIPA-forming process. In the case of (d), the weight of the polyisocyanates used in making the stabilizer is taken as the weight of the stabilizer multiplied by the weight percentage of polyisocyanate compounds used in stabilizer-forming reaction.

The dispersed PIPA particles may have diameters in the range of 0.05 µm to 20 µm. At least 95 weight-% of the PIPA particles preferably fall within that range of particle sizes. At least 90 weight-% of the PIPA particles may be smaller than 10 µm or smaller than 5 µm.

The dispersion has a hydroxyl number of at least 40. It preferably has a hydroxyl number of at least 50. The hydroxyl number may be as much as 300, as much as 200, or as much as 100. In some embodiments, the dispersed polyurethane or polyurethane-urea particles contain hydroxyl groups. In such cases, the hydroxyl number of the dispersion may be greater than that of the carrier polyol by itself. The hydroxyl number of the dispersion may be, for example 1.25 to 5 times, or 1.25 to 2.5 times, that of the carrier polyol by itself. This is a significant difference from SAN-type copolymer polyols, in which the dispersed particles do not contain reactive groups and for that reason the hydroxyl number of the SAN dispersion will always be lower than that of the carrier polyol by itself.

In certain specific embodiments, the PIPA polyol is a dispersion of 10 to 25% by weight dispersed polyurethane or polyurethane-urea particles in a carrier polyol (or mixture thereof), which carrier polyol or mixture has an average hydroxyl equivalent weight of 200 to 400, nominally contains 2 to 4, preferably 3, hydroxyl groups/molecule and contains at least 75% secondary hydroxyl groups. The dispersed polymer particles in such a case may be a reaction product of triethanolamine, toluene diisocyanate and optionally water. The PIPA-forming reaction in these specific embodiments may be performed in the presence of previously-formed PIPA polyol in which the dispersed phase functions as seed particles.

In other specific embodiments, the PIPA polyol is a dispersion of 10 to 25% by weight dispersed polyurethane or polyurethane-urea particles in a carrier polyol (or mixture thereof), which carrier polyol or mixture has an average hydroxyl equivalent weight of 401 to 1200, nominally contains 2 to 4, preferably 3, hydroxyl groups/molecule and contains at least 75% secondary hydroxyl groups. The dispersed polymer particles in such a case may be a reaction product of triethanolamine, toluene diisocyanate and optionally water. The PIPA-forming reaction in these specific embodiments may be performed in the presence of previously-formed PIPA polyol in which the dispersed phase functions as seed particles.

In yet other specific embodiments, the PIPA polyol is a dispersion of 10 to 25% by weight dispersed polyurethane or polyurethane-urea particles in a carrier polyol (or mixture thereof), which carrier polyol or mixture has an average hydroxyl equivalent weight of 1000 to 2500, nominally contains 2 to 4, preferably 3, hydroxyl groups/molecule. In such embodiments, the PIPA polyol may contain 0 to 100% primary hydroxyl groups and in some embodiments contains at least 50% primary hydroxyl groups. The dispersed polymer particles in such a case may be a reaction product of triethanolamine, toluene diisocyanate and optionally water. The PIPA-forming reaction in these specific embodiments may be performed in the presence of previously-formed PIPA polyol in which the dispersed phase functions as seed particles.

The polyol mixture further contains at least one polyol which is a homopolymer of propylene oxide or a copolymer of 20 to 99.9 weight-% propylene oxide and 0.1 to 80 weight-% ethylene oxide, has 2 to 4 hydroxyl groups per molecule and has a hydroxyl equivalent weight of 200 to 400. This polyol is sometimes referred to herein as Polyol B. Polyol B may be a single material or a mixture of two or more materials, in which case the foregoing values apply to the mixture. The weight-percentages of propylene oxide and ethylene oxide refer to the combined weights of the respective oxides polymerized to make the polyol. In some embodiments, Polyol B constitutes 40 to 85 weight-%, preferably 45 to 85 weight-%, of the polyol mixture.

In some embodiments, Polyol B may be a mixture of Polyols B1 and B2, wherein Polyol B1 is at least one polyol which is a copolymer of 50 to 80 weight-% ethylene oxide and correspondingly 50 to 20 weight-% propylene oxide, has 2.5 to 3.5 hydroxyl groups per molecule and a hydroxyl equivalent weight of 200 to 400, preferably 300 to 400 and Polyol B2 is at least one polyol which is a homopolymer of propylene oxide or a copolymer of greater than 80 weight-% propylene oxide and less than 20 weight-% ethylene oxide, has 2 to 4 hydroxyl groups per molecule and has a hydroxyl equivalent weight of 200 to 400. In such embodiments, Polyol B1 may constitute 30 to 60 weight-% of the polyol mixture and Polyol B2 may constitute 10 to 25 weight-% of the polyol mixture.

Polyols A and B together constitute at least 75 weight-%, preferably at least 80 weight-% of all isocyanate-reactive materials other than water in the reaction mixture. They may together constitute up to 100 weight-% of those isocyanate-reactive materials (again, exclusive of water). If additional isocyanate-reactive materials are present, they may include, for example, one or more of (a) At least one polyol having a hydroxyl equivalent weight of greater than 400, which does not contain dispersed polymer particles. This polyol (or mixture of polyols) may, for example, have an average hydroxyl equivalent weight of 400 to 3000, 500 to 2000, 800 to 1700, or 800 to 1500, and may have an average of 2 to 8, 2 to 4 or 2 to 3 hydroxyl groups per molecule. Such a polyol may be polyether polyol and if a polyether polyol may be a homopolymer of propylene oxide, a homopolymer of ethylene oxide, or a copolymer of propylene oxide and ethylene oxide in a weight ratio of 1:99 to 99:1, 50:99 to 99:1 or 70:30 to 99:1;

(b) At least one low equivalent weight isocyanate-reactive compound having at least two hydroxyl groups, at least one hydroxyl group and at least one primary or secondary amino group, at least one primary amino group, at least one primary amino group and at least one secondary amino group, or at least two secondary amino groups, and which has an equivalent weight per isocyanate-reactive group of up to 100 in the case of a diol and 150 otherwise, preferably 30 to 100 and more preferably 30 to 75. Examples of these include diethanolamine, triethanolamine, diethylene glycol, ethylene glycol, glycerin and 1,4-butanediol;

(c) One or more monols that can have a molecular weight of 30 to 5000. Such a monol may be a polyether monol, and such a polyether monol may be a polymer or copolymer of propylene oxide, butylene oxide and/or ethylene oxide; and (d) One or more diols that have a molecular weight of 101 to 1500. Such a diol may be, for example, a polyester or a polyether. If a polyether, it may be a polymer or copolymer of propylene oxide and/or ethylene oxide.

The reaction mixture preferably contains no SAN-type polymer polyol. In this way a source of VOCs (such as residual styrene and acrylonitrile monomers) is eliminated. VOCs in the VE foam can be evaluated, for example, by the VDA 278 test method.

In some embodiments, the polyol mixture contains no more than 2 weight-%, preferably no more than 1 weight-% of castor oil, and may be devoid of castor oil.

The reaction mixture preferably contains one or more catalysts. The catalyst(s) catalyze either or both of the water-isocyanate reaction and the alcohol-isocyanate reaction. Suitable catalysts include, for example, including tertiary amines, cyclic amidines, tertiary phosphines, various metal chelates, acid metal salts, strong bases, various metal alcoholates and phenolates and metal salts of organic acids. Examples of metal-containing catalysts are bismuth, cobalt and zinc salts. Catalysts of most importance are tertiary amine catalysts, cyclic amidines and tin catalysts. Examples of tertiary amine catalysts include: trimethylamine, triethylamine, N-methylmorpholine, N-ethylmorpholine, N,N-dimethylbenzylamine, N,N-dimethylethanolamine, N,N,N', N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used.

A reactive amine catalyst, such as DMEA (dimethylethanolamine) or DMAPA (dimethylaminopropyl amine), or an amine initiated polyol, acting as an autocatalytic polyol, may also be used to reduce VOC's (volatile organic compounds).

Tin catalysts are stannic chloride, stannous chloride, stannous octoate, stannous oleate, dimethyltin dilaurate, dibutyltin dilaurate, tin ricinoleate and other tin compounds of the formula $SnR_n(OR)_{4-n}$, wherein R is alkyl or aryl and n is 0 to 18, and the like. Tin carboxylates in which the carboxylate group has 6 to 18 carbon atoms are sometimes associated with lower VOCs in the VE foam. Tin catalysts are generally used in conjunction with one or more tertiary amine catalysts, if used at all.

Catalysts are typically used in small amounts, for example, each catalyst being employed from about 0.0015 to about 5% by weight of polyol(s). Tin catalysts are generally used in very small amounts within this range, such as from 0.0015 to 0.25 weight-%.

It is highly preferred to include a foam-stabilizing surfactant in the VE foam formulation. The foam-stabilizing surfactant helps stabilize the gas bubbles formed by the blowing agent during the foaming process until the polymer has cured. A wide variety of silicone surfactants as are commonly used in making polyurethane foams can be used in making the foams with the polymer polyols or dispersions of this invention. Examples of such silicone surfactants are commercially available under the tradenames Tegostab™ (Th. Goldschmidt and Co.), Niax™ (GE OSi Silicones) and Dabco™ (Air Products and Chemicals).

It may be desirable to include an auxiliary blowing agent in the reaction mixture. Such auxiliary blowing agents include physical (endothermic) blowing agents such as various low-boiling chlorofluorocarbons, fluorocarbons, hydrocarbons and the like; as well as chemical (exothermic) blowing agents (other than water) that decompose or react under the conditions of the polyurethane-forming reaction. In addition, a gas such as carbon dioxide, air, nitrogen or argon may be used as an auxiliary blowing agent in a frothing process. Carbon dioxide can also be used as a liquid or as a supercritical fluid.

In addition to the foregoing components, the polyurethane foam formulation may contain various other optional ingredients such as cell openers; fillers such as melamine and calcium carbonate; pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; biocides; preservatives; antioxidants; flame retardants; plasticizers, paraffin oil, plant or animal oils or fats, epoxidized vegetable oils and/or animal fats, wax particles, gel particles and the like.

Suitable flame retardants may be solid or liquid. They include, for example, one or more non-halogenated flame retardants and/or one or more halogenated flame retardants. Exemplary flame retardants include melamine or various melamine derivatives, phosphorous compounds that may or may not contain halogens, aluminum-containing compounds that may or may not contain halogens, various nitrogen-containing compounds that may or may not contain halogens, chlorinated compounds, various brominated compounds, expandable graphite, various boron compounds, and polyureas. In some embodiments, the flame retardant is melamine or a melamine derivative and one or more halogenated phosphorous compounds.

The VE foam is produced by combining the various components as described above to form a reaction mixture that is then foamed and cured. The process of this invention requires no special processing conditions; therefore, processing conditions and equipment described in the art for making polyurethane VE foam are entirely suitable. In general, the components of the reaction mixture are combined. In most cases when a catalyst is present, the isocyanate compounds will react spontaneously with water and the polyols even at room temperature (22° C.). If necessary, heat can be applied to the reaction mixture to speed the curing reaction. This can be done by heating some or all of the ingredients prior to combining them, by applying heat to the reaction mixture, or some combination of each. Curing is continued until the reaction mixture has expanded and cured sufficiently to form a stable foam.

In some embodiments, the curing step is performed in a closed mold. In such a process, the reaction mixture is either formed in the mold itself, or formed outside the mold and then injected into the mold, where it cures. The expansion of the reaction mixture as it cures is therefore constrained by the internal surfaces of the mold, as are the size and geometry of the molded part.

In other embodiments, the curing step is performed in a free-rise (or slabstock) process. In the free-rise process, the reaction mixture is poured into an open container such that expansion in at least one direction (usually the vertical direction) occurs against the atmosphere or a lightweight surface (such as a film) that provides negligible resistance to the expansion of the foam. In the free-rise process, the reaction mixture expands in at least one direction essentially unconstrained except by its own weight. The free-rise process may be performed by forming the reaction mixture and dispensing it into a trough or onto a conveyor where it expands and cures. The invention is of particular benefit in a continuous free-rise process, in which the reaction mixture is continuously dispensed into a trough or other reaction zone where it rises and expands. It has been found in such cases that the reaction mixture tends to process easily.

According to an exemplary embodiment, the foam product may be produced under vacuum using variable pressure foaming (VPF) methods.

The cured VE foam is characterized in having a foam density of 30 to 120 kg/m$^3$, preferably 40 to 80 kg/m$^3$ and more preferably 40 to 60 kg/m$^3$, as measured by ISO 3886.

The foam has a resiliency of less than 15%, preferably less than 10% and more preferably less than 8%, as measured by ASTM D-3574. The cured foam has a recovery time of at least 3 seconds, preferably at least 5 seconds, as measured according to ASTM D3574 Test M, modified as described in the examples below, with the time being measured until the recovering foam applies a force of 4.5N against the indenter or, if the foam is too soft to recover enough to apply a force of 4.5N, then the time is measured until the recovering form applies a force of only 1.0N. The recovery time may be 10 seconds or more or even 15 seconds or more. Recovery times to 4.5N will always be greater than recovery times to only 1.0N.

An advantage of this invention is the VE foam exhibits surprisingly high airflows combined with long recovery times. Airflows are conveniently measured according to ASTM D-3574. Uncrushed VE foams of the invention may exhibit airflows of at least 40, at least 57, at least 80 or at least 125 liters/minute, and may be as high as 500 liters/minute. The VE foam may be crushed to further increase airflow. Higher airflows are often important to perceived comfort when the foam is used in personal cushioning applications, since air movement through the foam helps to dissipate body heat, which makes the foam feel cooler and more comfortable. Heat retention is a widely-recognized problem with previously VE foam pillows and mattresses; therefore the ability to dissipate heat through greater movement of air through the foam is an important advantage. Open foam is also key for acoustic applications.

The VE foam of the invention may meet one or more FR (Flame Resistance) standards, such as British Standard flammability test (BS 5852—ignition source 5) using a wooden assembly (referred to as a crib) as a source of ignition.

The VE foam of the invention is useful in cushioning applications such as pillows, mattresses, backrests (for bed headboards, seating, etc.), seating cushions, packaging, protective cushioning, and the like. They can be used as or as a component of sound and/or vibration (i.e., NVH) damping measures. They are useful in other applications where slow recovery after foam compression is wanted. In general, the VE foam of the invention can be used in the same applications and in the same manner as conventionally-produced VE foam.

The following examples are provided to illustrate the invention, but are not intended to limit the scope thereof. All parts and percentages are by weight unless otherwise indicated.

Isocyanate A is a polymeric MDI available as PAPI 94 from The Dow Chemical Company. This product has an isocyanate equivalent weight of 131.5 and an average isocyanate functionality of 2.3.

Isocyanate B is a polymeric MDI available as ISONATE M 320 from Dow The Chemical Company. This product has an isocyanate equivalent weight of 130 and an average isocyanate functionality of 2.3.

Isocyanate C is a toluene diisocyanate (TDI) mixture of 65% 2,4-TDI and 35% 2,6 TDI.

PIPA Polyol A is a 20% solids dispersion of polyurethane particles in a carrier polyol. The carrier polyol is a 3000 molecular weight, nominally trifunctional poly(propylene oxide) having at least 90% secondary hydroxyl groups. The polyurethane particles are the reaction product of triethanolamine and an 80/20 mixture of the 2,4- and 2,6-isomers of toluene diisocyanate. PIPA Polyol A is prepared in the general process described in U.S. Provisional U.S. Provisional Application No. 61/877,290, filed 13 Sep. 2013. Its hydroxyl number is approximately 75, whereas that of the carrier polyol is about 56.

PIPA Polyol B is made in the same general way as PIPA Polyol A, except the carrier polyol is a 5000 molecular weight nominally trifunctional material made by sequentially adding propylene oxide and ethylene oxide to a trifunctional starter. The carrier polyol contains at least 85% primary hydroxyl groups. The solids content is 20 weight-%. Its hydroxyl number is approximately 60, whereas that of the carrier polyol is 33.

Polyol B1 is a nominally trifunctional copolymer of about 40% propylene oxide and 60% ethylene oxide, having a number average molecular weight of approximately 1000 g/mole. Polyol B2-A is a nominally trifunctional polyoxypropylene having a number average molecular weight of approximately 700 g/mole.

Polyol B2-B is a nominally trifunctional polyoxypropylene having a number average molecular weight of approximately 1000 g/mole (available as VORANOL 3150 from The Dow Chemical Company).

Polyol C is a nominally trifunctional polyoxypropylene polyether having a number average molecular weight of approximately 3000 g/mole (available as VORANOL™ WK 3138 from The Dow Chemical Company).

Polyol D is a nominally trifunctional random copolymer of 88% propylene oxide and 12% ethylene oxide, having a number average molecular weight of approximately 3500 g/mole (available as VORANOL 3322 from The Dow Chemical Company).

Polyol E is a nominally trifunctional random copolymer of 87% propylene oxide and 13% ethylene oxide, having a number average molecular weight of approximately 3000 (available as VORANOL 3010 from The Dow Chemical Company).

Polyol F is a nominally trifunctional poly(propylene oxide) capped with 18% ethylene oxide, having a number average molecular weight of approximately 6000 (available as VORANOL 6001 from The Dow Chemical Company)

Monol A is copolymer of 50% propylene oxide and 50% ethylene oxide with a number average molecular weight of approximately 500 g/mole.

SAN Polyol A is a SAN polymer polyol containing 40% of solids dispersed in a carrier polyol. The carrier polyol is a polyether triol having a number average molecular weight of approximately 3000. SAN Polyol A is available as VORALUX™ HL 400 from The Dow Chemical Company.

SAN Polyol B is a SAN polymer polyol containing 40% solids dispersed in a carrier polyol. The carrier polyol is a polyether triol having a number average molecular weight of approximately 5000. SAN polyol B is available as SPECFLEX™ NC 700 from the Dow Chemical Company. The carrier polyol has a hydroxyl number of about 33 but SAN Polyol B has a hydroxyl number of only about 20.

Silicone Surfactant A is an organosilicone surfactant available as Niax™ L-620 from Momentive).

Silicone Surfactant B is an organosilicone surfactant available as Niax L-618 from Momentive.

Silicone Surfactant C is an organosilicone surfactant available as Tegostab B8239 from Evonik.

FR agent A is a halogenated phosphate ester available as Antiblaze TMCP from Albemarle.

FR agent B is melamine.

Catalyst A is commercial grade of stannous octoate (available as Dabco® T9 from Air Products).

Catalyst B is a solution containing 70% of bis(2-dimethylaminoethyl) ether (available as Niax Al from Momentive).

Catalyst C is a 33 wt.-% solution of triethylenediamine in dipropylene glycol (available as Dabco 33LV from Air Products).

Examples 1 to 3 and Comparative Examples A to D are prepared in a slabstock forming process according to the formulations in Table 1 below. All ingredients except the polyisocyanate are mixed and the resulting mixture is combined with the polyisocyanate at room temperature using a bench scale static mixer. The reaction mixture is then poured into an open container and allowed to rise and cure. When sufficiently cured to be removed from the container, the foam samples are annealed in an oven for 5 minutes and allowed to further cure for 24 hours at ambient temperature before testing.

Foam density is measured according to ISO 3386. CFD (compression force deflection) is measured according to ISO 3386. Resiliency and airflow (on uncrushed foam samples) are measured according to ASTM 3574.

Recovery time is measured according to ASTM D3574 Test M, modified in that the indentation foot is brought into contact with it with a pre-load of 1N (rather than 4.5N) to determine the specimen's initial thickness. Time recording stops as soon as the foam recovers to apply a 4.5 N load against the indentation foot.

TABLE 1

| Ingredient | Ex. 1 | Ex. 2 | Comp. Sample A | Comp. Sample B | Comp. Sample C | Ex. 3 | Comp. Sample D |
|---|---|---|---|---|---|---|---|
| Polyol B1 | 55 | 55 | 55 | 55 | 55 | 60 | 60 |
| Polyol B2-A | 15 | 15 | 15 | 15 | 15 | 15 | 15 |
| Polyol D | 20 | 10 | 30 | 25 | 20 | 5 | 25 |
| SAN polyol A | 0 | 0 | 0 | 5 | 10 | 0 | 0 |
| PIPA polyol A | 10 | 20 | 0 | 0 | 0 | 0 | 0 |
| PIPA polyol B | 0 | 0 | 0 | 0 | 0 | 20 | 0 |
| Water | 2 | 2 | 2 | 2 | 2 | 2 | 2 |
| Catalyst A | 0.06 | 0.06 | 0.06 | 0.06 | 0.06 | 0.06 | 0.06 |
| Catalyst B | 0.15 | 0.15 | 0.15 | 0.15 | 0.15 | 0.15 | 0.15 |

TABLE 1-continued

|  | Ex. 1 | Ex. 2 | Comp. Sample A | Comp. Sample B | Comp. Sample C | Ex. 3 | Comp. Sample D |
|---|---|---|---|---|---|---|---|
| Catalyst C | 0.05 | 0.05 | 0.05 | 0.05 | 0.05 | 0.05 | 0.05 |
| Surfactant A | 0.8 | 0.8 | 0.8 | 0.8 | 0.8 | 0.8 | 0.8 |
| Isocyanate B (index) | 82 | 82 | 82 | 82 | 82 | 82 | 82 |
| Foam Properties | | | | | | | |
| Density (kg/m$^3$) | 49.0 | 47.5 | 48.4 | 48.9 | 48.7 | 48.3 | 48.3 |
| CFD 40% (kPa) | 1.6 | 1.7 | 1.4 | 1.7 | 1.8 | 2.0 | 1.7 |
| Resiliency, % | <15 | <15 | <15 | <15 | <15 | <15 | <15 |
| Airflow, L/m (cfm) | 80 (2.8) | 80 (2.8) | 57 (2.0) | 59 (2.1) | 54 (1.9) | 91 (3.2) | 80 (2.8) |
| Recovery time (s) to 4.5 N | 20 | 19 | 15 | 9 | 10 | 5 | 3 |

Comparative Samples A and D are controls. They differ in that Comparative Sample A is made with slightly more Polyol D and a correspondingly smaller amount of Polyol B1. Together, these samples demonstrate the difficulty in simultaneously obtaining high airflows and long recovery times. Comparative Sample A has a long recovery time, but airflow is somewhat low. In Comparative Sample B, airflow is increased, but at a large cost in recovery time.

Comparative Samples B and C demonstrate the effect of incorporating an SAN-type polymer polyol into the formulation. It results in little change in airflow (compared to Comparative Sample A), but a large drop in recovery time.

Examples 1-2 demonstrate that increases in both airflow and recovery time can be obtained with a PIPA polyol. This is contrary to the result with SAN polymer polyols. Example 3 demonstrates the effect of using a PIPA polyol based on a 5000 molecular weight polyol. The presence of such a much higher equivalent weight polyol would be expected, in the absence of the PIPA particles, to greatly affect the VE foam properties. As can be seen, good quality VE foam is obtained with a very high airflow.

Examples 4-6 and Comparative Samples E and F are made and tested in the same general manner as the preceding Examples, using formulations as indicated in Table 2. Because the foam samples are quite soft in this set of experiments and so will not recover enough to apply a force of 4.5N against the indenter, the test is truncated when the recovered foam applies a force of only 1N.

TABLE 2

|  | Ex. 4 | Ex. 5 | Comp. Sample E | Comp. Sample F | Ex. 6 |
|---|---|---|---|---|---|
| Component | | | | | |
| Polyol B1 | 50 | 50 | 50 | 50 | 0 |
| Polyol B2-B | 15 | 15 | 15 | 15 | 0 |
| Polyol C | 15 | 0 | 0 | 0 | 13 |
| PIPA Polyol A | 20 | 35 | 0 | 0 | 13 |
| SAN polyol A | 0 | 0 | 4 | 4 | 0 |
| SAN polyol B | 0 | 0 | 16 | 16 | 0 |
| Polyol B2-A | 0 | 0 | 0 | 0 | 59 |
| Monol A | 0 | 0 | 0 | 0 | 15 |
| FR agent A | 0 | 0 | 0 | 0 | 24 |
| FR agent B | 0 | 0 | 0 | 0 | 35 |
| Catalyst A | 0.05 | 0.05 | 0.05 | 0.05 | 0.3 |
| Catalyst B | 0.2 | 0.2 | 0.2 | 0.2 | 0.08 |
| Catalyst C | 0.05 | 0.05 | 0.05 | 0.05 | 0.16 |
| Surfactant B | 0.8 | 0.8 | 0.8 | 0.8 | 0 |
| Surfactant C | 0 | 0 | 0 | 0 | 0.75 |
| Water | 2.1 | 2.1 | 2.1 | 2.1 | 2.7 |
| Isocyanate A (index) | 72 | 72 | 72 | 72 | 0 |
| Isocyanate C (index) | 0 | 0 | 0 | 0 | 93 |
| Foam Properties | | | | | |
| Density (kg/m$^3$) | 68.6 | 69 | 66.6 | 67.8 | 47.3 |
| Resiliency, % | <15 | <15 | <15 | <15 | <15 |
| Airflow, L/m (cfm) | 158 (5.6) | 144 (5.1) | 48 (1.7) | 51 (1.8) | 82 (2.9) |
| Recovery time (s) to 1 N | >20 | >20 | 10 | 10 | 9 |
| 90% Dry Compression Set, % | 3.1 | 3.5 | ND | ND | ND |

ND means not determined

Examples 4 and 5 versus Comparative Samples E and F again demonstrate the superior results when a PIPA polyol replaces an SAN-type polyol. Airflows and recovery times are much higher for the foams made with the PIPA polyol.

Example 6 demonstrates a high airflow in a formulation significantly different than Examples 4 and 5 and Comparative Samples E and F.

Example 6 is evaluated on the Crib 5 flammability test (BS 5852, ignition source 5), using a wooden crib prepared with 18 wooden sticks having dimensions of 40×6.5×6.5 mm with a total mass of 17 grams. 1.4 mL of Propan-2-ol is added to the lint to start the test. The pass/fail criteria are: (i) no more than 60 grams of weight loss per specimen, (ii) self-extinguishing within 10 minutes from the ignition of the specimen (iii) flame cannot penetrate the full thickness of the sample, and (iv) no more than 10 cm of damage on either side of the ignition source (measured as no more than 25 cm of damage in a width-wise direction in which the crib structure having a width of 5 cm is presumed as the center. According to these criteria, Example 6 passes the Crib 5 flammability test.

What is claimed is:

1. A method of making a viscoelastic foam, comprising combining at least one organic polyisocyanate with water and a polyol mixture at an isocyanate index of 60 to 150 to form a reaction mixture and curing the reaction mixture to form a polyurethane-urea foam having a foam density of 30 to 120 kg/m$^3$, a resiliency of less than 15% and a recovery time of at least 3 seconds as measured according to ASTM D3574 Test M, modified in that an indentation foot is brought into contact with the viscoelastic with a pre-load of 1N to determine the specimen's initial thickness and that time recording stops as soon as the viscoelastic foam recovers to apply a 4.5 N load against the indentation foot or, if the viscoelastic foam is too soft to recover enough to apply a force of 4.5N, then time recording stops when the viscoelastic foam recovers to apply a force of only 1 N against the indentation foot, wherein the polyol mixture includes:

Polyol A: at least one dispersion of polyurethane and/or polyurethane-urea particles in a carrier polyol, wherein said carrier polyol has an average molecular weight of 600 to 5000 and an average of at least two hydroxyl groups per molecule, the polyurethane or polyurethane-urea particles constitute from 5 to 50 weight percent of Polyol A and the Polyol A has a hydroxyl number of at least 40; and Polyol B: at least one polyol which is a homopolymer of propylene oxide or a copolymer of 20 to 99.9 weight-% propylene oxide and 0.1 to 80 weight-% ethylene oxide, has 2 to 4 hydroxyl groups per molecule and has a hydroxyl equivalent weight of 200 to 400;

and further wherein Polyols A and B together constitute at least 75 weight-percent of all isocyanate-reactive materials other than water in the reaction mixture and the polyol mixture contains at least 1 weight-percent of the polyurethane and/or polyurethane-urea particles.

2. The method of claim 1 wherein Polyol A constitutes 3 to 60 weight percent of the polyol mixture.

3. The method of claim 2 wherein Polyol B constitutes 40 to 85 weight percent of the polyol mixture.

4. The method of claim 1 wherein Polyol B is a mixture of Polyols B1 and B2, wherein Polyol B1 is at least one polyol which is a copolymer of 50 to 80 weight-% ethylene oxide and correspondingly 50 to 20 weight-% propylene oxide, has 2.5 to 3.5 hydroxyl groups per molecule and a hydroxyl equivalent weight of 200 to 400 and polyol B2 is at least one polyol which is a homopolymer of propylene oxide or a copolymer of greater than 80 weight-% propylene oxide and less than 20 weight-% ethylene oxide, has 2-4 hydroxyl groups per molecule and has a hydroxyl equivalent weight of 200 to 400.

5. The method of claim 4 wherein Polyol B1 constitutes 30 to 60 weight-% of the polyol mixture and Polyol B2 constitutes 10 to 25 weight-% of the polyol mixture.

6. The method of claim 1, wherein Polyol A has a higher hydroxyl number than the carrier polyol.

7. The method of claim 1, wherein the polyurethane and/or polyurethane-urea particles constitute from 5 to 25 weight percent of Polyol A.

8. The method of claim 1, wherein Polyol A contains 10 to 25% by weight of said polyurethane and/or polyurethane-urea particles, and said carrier polyol has an average hydroxyl equivalent weight of 200 to 400, nominally contain 2 to 4 hydroxyl groups per molecule and contains at least 75% secondary hydroxyl groups.

9. The method of claim 1, wherein Polyol A contains 10 to 25% by weight of said polyurethane and/or polyurethane-urea particles and said carrier polyol has an average hydroxyl equivalent weight of 401 to 1200, nominally contains 2 to 4 hydroxyl groups per molecule and contains at least 75% secondary hydroxyl groups.

10. The method of claim 1, wherein Polyol A contains 10 to 25% by weight of said polyurethane and/or polyurethane-urea particles, and said carrier polyol has an average hydroxyl equivalent weight of 1000 to 2500 and nominally contains 2 to 4 hydroxyl groups per molecule.

11. The method of claim 3 wherein said polyurethane and/or polyurethane-urea particles are a reaction product of triethanolamine, toluene diisocyanate and optionally water.

12. The method of claim 3 wherein the reaction mixture does not contain an SAN-type polymer polyol.

13. The method of claim 12 wherein the polyol mixture contains no more than 2 weight-% of castor oil.

14. The method of claim 1 wherein the viscoelastic foam is made in a free-rise process wherein a curing step is performed by pouring the reaction mixture into an open container such that expansion in at least one direction occurs against the atmosphere or a lightweight surface that provides negligible resistance to the expansion of the foam.

15. The method of claim 14 which is performed by continuously pouring the reaction mixture into the open container.

16. The method of claim 1 wherein the viscoelastic foam is cured in a mold.

17. The method of claim 1 wherein the viscoelastic foam has an airflow prior to crushing of at least 57 L/m.

18. The method of claim 1 wherein the viscoelastic foam has an airflow prior to crushing of at least 57 L/m and said recovery time of at least 10 seconds.

19. The method of claim 1 wherein the viscoelastic foam has an airflow prior to crushing of at least 80 L/m and said recovery time of at least 10 seconds.

* * * * *